United States Patent [19]

Ogawa

[11] Patent Number: 4,999,721

[45] Date of Patent: Mar. 12, 1991

[54] RECORDING AND/OR REPRODUCING APPARATUS

[75] Inventor: Masahiko Ogawa, Tokyo, Japan

[73] Assignee: Canon Kabushiki Kaisha, Tokyo, Japan

[21] Appl. No.: 479,346

[22] Filed: Feb. 13, 1990

Related U.S. Application Data

[63] Continuation of Ser. No. 401,559, Aug. 28, 1989, abandoned, which is a continuation of Ser. No. 281,869, Dec. 7, 1988, abandoned, which is a continuation of Ser. No. 39,803, Apr. 15, 1987, abandoned, which is a continuation of Ser. No. 562,704, Dec. 19, 1983, abandoned.

[30] Foreign Application Priority Data

Dec. 23, 1982 [JP] Japan ................................ 57-230461
Dec. 23, 1982 [JP] Japan ................................ 57-230462

[51] Int. Cl.⁵ .......................................... G11B 15/44
[52] U.S. Cl. .................................... 360/74.1; 360/69;
    360/71; 360/99.06; 360/137
[58] Field of Search ..................... 360/74.1, 74.6, 69,
    360/71, 86, 96.5, 97.01, 98.07, 99.01–99.06, 137;
    369/258, 261

[56] References Cited

U.S. PATENT DOCUMENTS

| 4,376,293 | 3/1983 | Teramura et al. | 360/71 |
| 4,413,291 | 11/1983 | Veki et al. | 360/71 |
| 4,458,273 | 7/1984 | Johnson | 360/74.1 |
| 4,523,239 | 6/1985 | Iwasawa | 360/74.1 |
| 4,590,532 | 5/1986 | Saito | 360/133 |

FOREIGN PATENT DOCUMENTS

| 56-16960 | 2/1981 | Japan | 369/261 |
| 56-90466 | 7/1981 | Japan | 360/137 |
| 56-140568 | 11/1981 | Japan | 360/137 |
| 57-18067 | 1/1982 | Japan | 360/137 |
| 57-203257 | 12/1982 | Japan | 360/96.5 |
| 57-210477 | 12/1982 | Japan | 360/137 |
| 58-1850 | 1/1983 | Japan | 360/99 |
| 58-121181 | 7/1983 | Japan | 360/97.1 |
| 2099203 | 12/1982 | United Kingdom | 360/69 |

OTHER PUBLICATIONS

"Circuitry for Testing the Translatory Movement of a Magnetic Diskette into a Disk Drive", by J. Olson, IBM TDB, vol. 21, No. 11 (Apr. 1979), pp. 4620–4623.

Murakami, "Drive Control Circuit of Motor for Floppy Disk", Patent Abstracts of Japan, vol. 14, No. 160, Aug. 21, 1980, p. 35.

*Primary Examiner*—John H. Wolff
*Attorney, Agent, or Firm*—Toren, McGeady & Associates

[57] ABSTRACT

A recording and/or reproducing apparatus using a recording medium such as a magnetic disc or drum. The apparatus includes apparatus for driving the recording medium, apparatus for detecting the movement of the recording medium, and apparatus for stopping the drive apparatus when the detection apparatus does not detect the movement of the recording medium within a predetermined period of time after the drive apparatus begins to operate.

49 Claims, 6 Drawing Sheets

RECORDING AND/OR REPRODUCING APPARATUS

This is a continuation application of Ser. No. 07/401,559, filed Aug. 28, 1989, now abandoned, which in turn is a continuation application of Ser. No. 07/281,869, filed Dec. 7, 1988, now abandoned, which in turn is a continuation application of Ser. No. 07/039,803 filed Apr. 15, 1987, now abandoned, which in turn is a continuation application of Ser. No. 06/562,704, filed Dec. 19, 1983 now abandoned.

BACKGROUND OF THE INVENTION

1. Field of the Invention

This invention relates to a recording and/or reproducing apparatus which records information on a recording medium and/or reproduces recorded information from a recording medium while driving the medium.

2. Description of the Prior Art

Recording and/or reproducing apparatus, especially those adapted for still video cameras, have recently held public attention. However, it is important for a recording and/or reproducing apparatus of this kind to be reduced in size and weight and the capacity of the power source to be incorporated therein should be more portable. This requirement calls for an arrangement to save electric energy from being wasted. It is also necessary to provide the apparatus with suitable means for protecting a recording medium driving motor or a motor driving circuit from being damaged by a continuous large current flow to the motor when the apparatus is out of order. Meanwhile, the recording medium are also becoming smaller and thinner and thus becoming mechanically frail as the size and weight of the apparatus are reduced. The apparatus, therefore, should protect the recording medium from being damaged.

It is therefore a principal object of the invention to provide a recording and/or reproducing apparatus which is capable of solving the above problems presented by the apparatus of the prior art.

It is another object of the invention to provide a recording and/or reproducing apparatus which is capable of preventing a recording medium or a recording medium driving means from being damaged by an undue driving action on the medium or by overloading the driving means even if the recording medium is inappositely loaded or mounted on the apparatus.

It is still another object of the invention to provide a recording and/or reproducing apparatus which is capable of preventing the waste of electric energy by cutting off the power to a recording medium driving motor when no movement of a recording medium is detected after the power supply to the motor has commenced; it prevents the motor or a motor driving circuit from being damaged by a continuous large current flow when a load is imposed on the motor to hinder it from rotating for some reason under the above condition or when the recording medium is either broken or inappositely mounted on the recording medium, so that the safety and durability of both the apparatus and the recording medium can be enhanced.

It is another another object of the invention to provide a recording and/or reproducing apparatus which is not only capable of attaining the above object but is also capable of preventing wasted electric energy by supplying power to the recording medium driving motor only when mounting of the recording medium on the apparatus is detected.

It is still another object of the invention to provide a recording and/or reproducing apparatus including means for preventing a recording medium and parts associated therewith from being damaged either at the time of mounting the medium or immediately after mounting and also for protecting the operator of the apparatus from any danger.

These and further objects and features of the invention will become apparent from the following detailed description of the preferred embodiments thereof taken in conjunction with the accompanying drawings.

SUMMARY OF THE INVENTION

To attain the first object, a preferred embodiment of the invention representing an aspect thereof is provided with driving means for driving a recording medium; detection means for detecting the movement of the recording medium; and stop means for stopping the drive means when the detection means does not detect the movement of the recording medium within a predetermined period of time after the drive means begins to operate.

To attain the second object, a preferred embodiment of the invention is provided with a motor for driving the recording medium; detecting means for detecting the movement of the recording medium; and cut-off means for cutting off the power to the motor when no detection signal is obtained from the detecting means within a predetermined time period after the power is supplied to the motor.

To attain the third object, a preferred embodiment of the invention is provided with a motor for driving a recording medium; first detecting means for detecting loading of the recording medium to the apparatus; power supply permitting means for allowing power to be supplied to the motor in response to detection of the loading of the recording medium to the apparatus by the first detecting means; second detecting means for detecting movement of the recording medium; and cut-off means for cutting off the power supply to the motor when no detection signal is obtained from the second detecting means within a predetermined period of time after the power supplied to the motor has commenced.

To attain the fourth object, a preferred embodiment representing another aspect of the invention is provided with driving means for driving a recording medium; operation order generating means for instructing the driving means to operate; detecting means for detecting that the recording medium is loaded in the apparatus; and control means for actuating the driving means after the lapse of a predetermined time period from a point of time when the loading of the recording medium is detected by the detecting means with the operation order having been issued from the operation order generating means.

BRIEF DESCRIPTION OF THE DRAWINGS

Some preferred embodiments will be explained with reference to the accompanying drawings, in which.

DETAILED DESCRIPTION OF THE PREFERRED EMBODIMENTS

Figure 1:
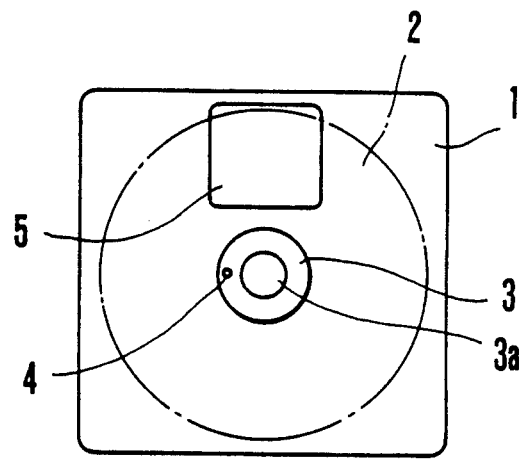
FIG. 1 is a plan view showing a magnetic disc cassette usable on a recording and/or reproducing apparatus according to the invention.

Description of a device for detecting the recording medium and the rotation phase thereof (FIGS. 1 and 2):

Referring to FIG. 1, a cassette 1 contains a magnetic disc 2 which is used as a recording medium. A center core 3 is secured to the center part of the magnetic disc 2 by means of an adhesive or the like. A magnetic pin 4 pierces the center core 3. The cassette 1 is provided with an opening 5 for allowing a magnetic head HE (shown in FIG. 2) to contact the magnetic disc 2.

Figure 2:
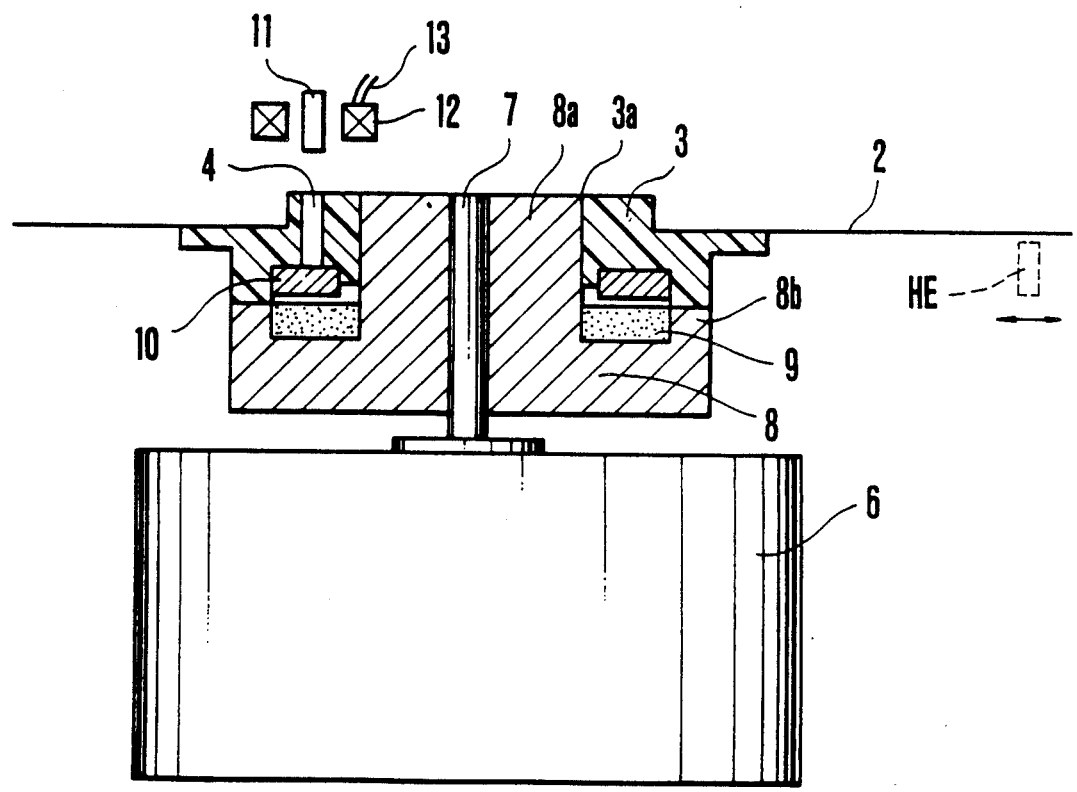
FIG. 2 is an enlarged sectional view of a magnetic disc rotation phase detecting device for the recording and/or reproducing apparatus according to the invention.

In FIG. 2, a motor 6 serves as the disc rotating means. The motor 6 is provided with a rotation shaft 7. A disc mounting hub 8 is secured to the rotation shaft 7. A disc chucking permanent magnet 9 is buried in the upper portion of a flange portion of a flange part 8b of the hub 8 and is axially magnetized. The center core 3 is made of a nonmagnetic material such as a plastic material. An opening 3a is in the center of the center core 3 to engage a spindle part 8a of the hub 8. The magnetic pin 4 is disposed outside of the opening 3a. A chucking ring 10, which is made of a magnetic material, is secured to the lower surface of the center core 3. The center core 3 is magnetically secured to the hub 8 by the magnetic attraction of the ring 10 by the magnet 9 and thus rotates together with the rotation shaft 7 of the motor 6. Furthermore, the magnetic pin 4 is secured to the ring 10, for example, by caulking.

The magnetic pin 4 extends within the center core 3 to the surface of the core 3 on the side opposite the ring 10. To the pin 4 is opposed a PG core 11 which is made of a magnetic material and is set in a fixed position. A PG coil 12 is wound around the PG core 11. The output of the coil 12 is taken out through a lead wire 13. In this arrangement, the magnetic flux of the permanent magnet 9 passes through the ring 10 and the magnetic pin 4 forming a leakage flux outside of the center core 3 of the magnetic disc 2. With the center core 3 rotated, the PG core 11 has a maximum magnetic flux when the magnetic pin 4 reaches a point opposite the PG core 11 or close thereto. The magnetic flux decreases as the magnetic pin 4 moves farther away from the PG core 11. Accordingly, an electrical current is produced at the PG coil 12 in proportion to the time-base variation of the magnetic flux passing through the PG core 11. The rotation phase of the magnetic disc 2 is detected through this current. This current is used via the lead wire 13 by an arrangement which will be described later herein.

A magnetic head HE, which is indicated by a broken line in FIG. 2, serves as the recording and/or reproducing means. The magnetic head HE approaches the magnetic disc 2 and is shifted in the direction of the arrows by known means.

Figure 3:
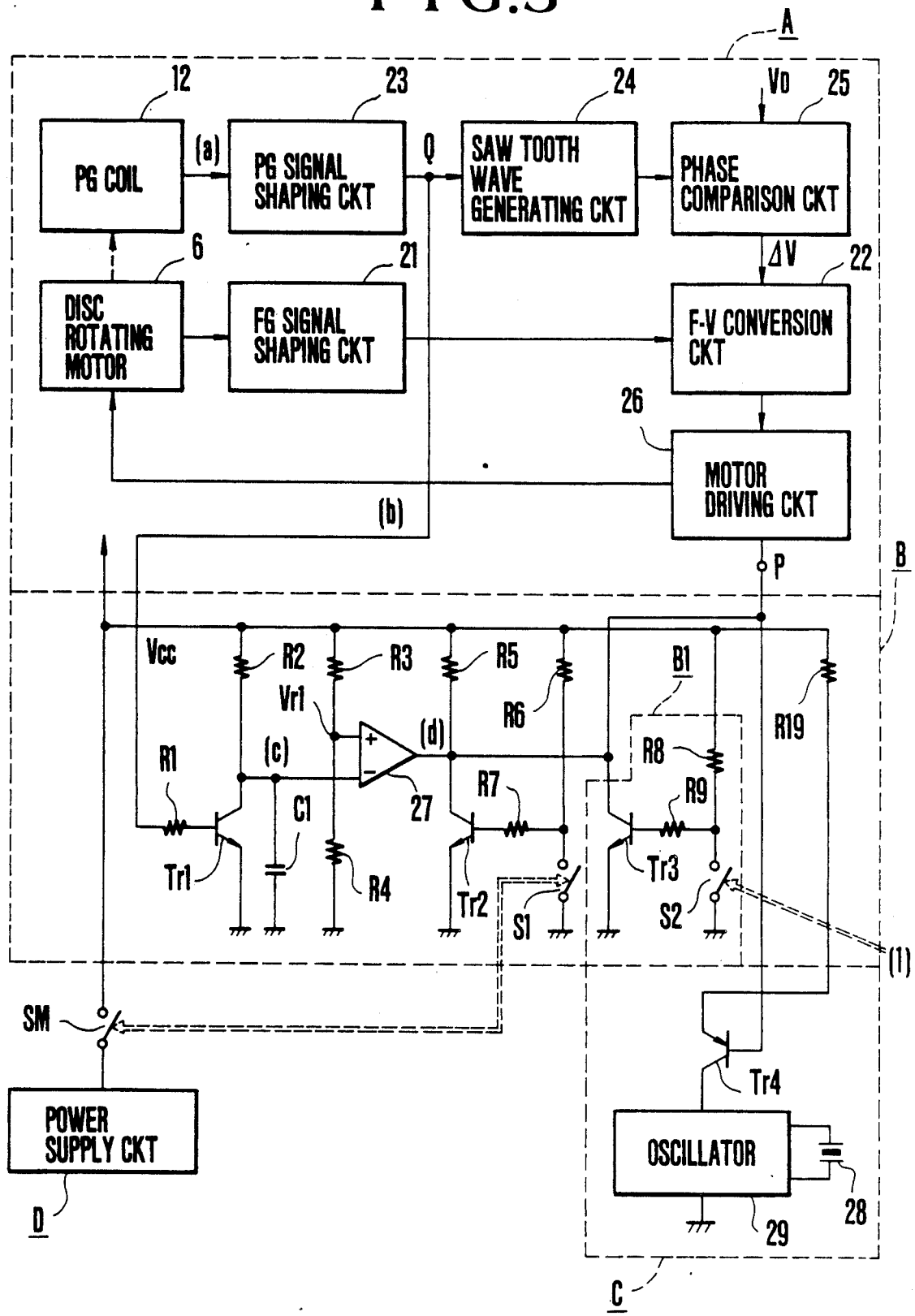
FIG. 3 is a circuit diagram showing the circuit arrangement of a recording and/or reproducing apparatus in a first embodiment of the invention.
Figure 4:
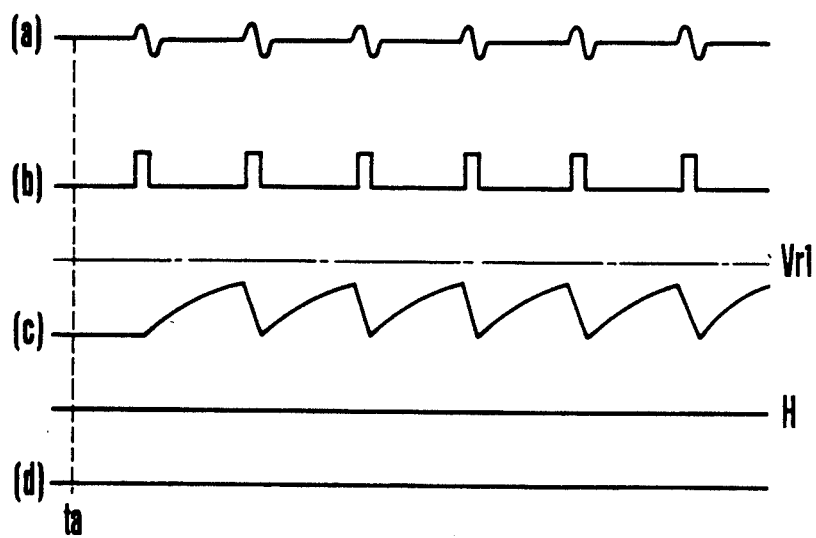
FIGS. 4 and 5 are illustrations showing respectively a normal operation and an abnormal operation of the apparatus shown in FIG. 3.
Figure 5:
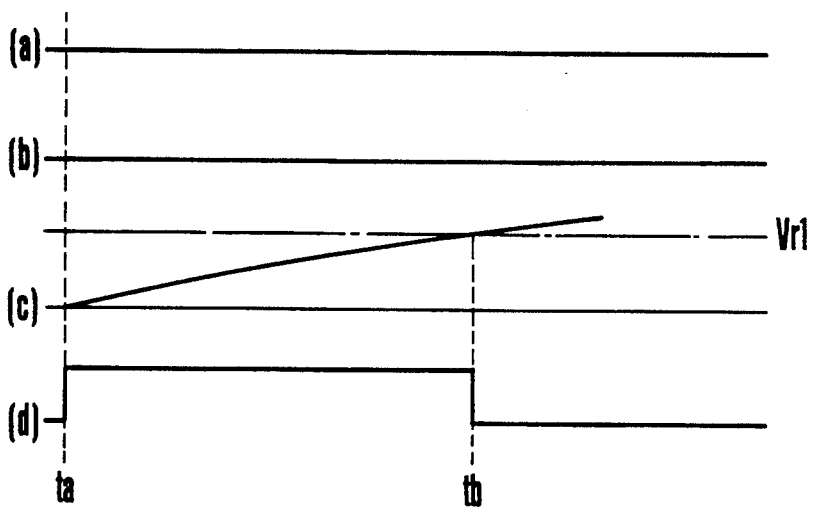

Embodiment I (FIGS. 3-5)

Referring to FIG. 3, a block A shows an ordinary motor servo system. A block B shows a control system embodying the present invention. A block C shows a warning arrangement to be preferably included in the apparatus according to the invention. A block D shows a power supply circuit.

In the motor servo system A, a frequency signal (hereinafter called an FG signal) is produced by known means according to the rotation of the rotation shaft 7 of the disc rotating motor 6. The frequency signal FG has its wave-form shaped by the FG signal shaping circuit 21. The frequency signal FG is then supplied to an F-V conversion circuit 22, which produces a voltage according to the frequency of the signal. Meanwhile, a rotation phase signal (hereinafter called a PG signal—FIG. 4(a)) is produced at a PG coil 12 which is provided for detecting the rotation phase of the magnetic disc 2 (the disc 2 of FIG. 2) rotated by the disc rotating motor 6. The phase signal PG has its wave-form shaped by a PG signal shaping circuit 23 into a wave-form, as shown in FIG. 4(b). In synchronization with the output of the circuit 23, a saw tooth wave-form signal is produced from a saw tooth wave generating circuit 24. The saw tooth signal is phase compared with a reference phase signal VD at a phase comparison circuit 25. The comparison circuit 25 produces an error signal $\Delta V$ as a result of the comparison. The error signal $\Delta V$ is then added to the frequency signal FG at the F-V conversion circuit 22. A sum thus obtained is supplied to a motor driving circuit 26, controlling the rotating velocity and the rotation phase of the rotation shaft 7 of the motor 6 thereby.

In accordance with the present invention, the control input terminal P of the motor driving circuit 26 is connected to the control system B. When the control input level to the terminal P is high, the motor servo system A operates in a normal manner. When the control input level is low, on the other hand, the power supply to the motor 6 is cut off. In other words, the control system B starts and stops the disc rotating motor 6. In the control system B, an npn switching transistor Tr1 has its base connected via a resistor R1 to the output terminal Q of the PG signal shaping circuit 23, its collector via a resistor R2 to a power source Vcc (hereinafter sometimes called the power source) and its emitter grounded. A capacitor C1 forms a time constant circuit together with the resistor R2. The capacitor C1 is connected between the collector of the transistor Tr1 and the ground and is further connected to the inversion input terminal (−) of a comparison circuit 27. Voltage dividing resistors R3 and R4 are series connected to the power source. A connection point between the resistors R3 and R4 is connected to the non-inversion input terminal (+) of the comparison circuit 27 to give a reference potential Vr1. The output terminal of the comparison circuit 27 is connected via a pull-up resistor R5 to the power source and to the control input terminal P of the motor driving circuit 26. An operation ordering (instructing) switch S1 for the disc rotating motor 6 is connected via a resistor R6 to the power source and to the base of an npn switching transistor Tr2 via a resistor R7. The collector of the transistor Tr2 together with the output terminal of the comparison circuit 27 is connected to the pull-up resistor R5 and the above terminal P. The emitter of the transistor Tr2 is grounded. The block B includes a block B1, in which:

A switch S2 is provided for detecting loading of a recording medium (the cassette 1 of FIG. 1 in this instance) to the apparatus. This recording medium loading detection switch S2 is connected via a resistor R8 to the power source and via a resistor R9 to the base of an npn switching transistor Tr3. The transistor Tr3 has its collector connected to the pull-up resistor R5 and the above terminal P together with the collector of the transistor Tr2. The emitter of the transistor Tr3 is grounded.

The warning arrangement C consists of a sound emitting element 28 and an oscillator 29 which operates the sound emitting element 28. The oscillator 29 is connected to the collector of an npn switching transistor Tr4. The transistor Tr4 has its emitter connected via a resistor R19 to the power source and its base to the output terminal of the comparison circuit 27. The warning arrangement C may use some visible display element such as a light emitting diode or the like in place of the sound emitting element 28.

Figure 6:
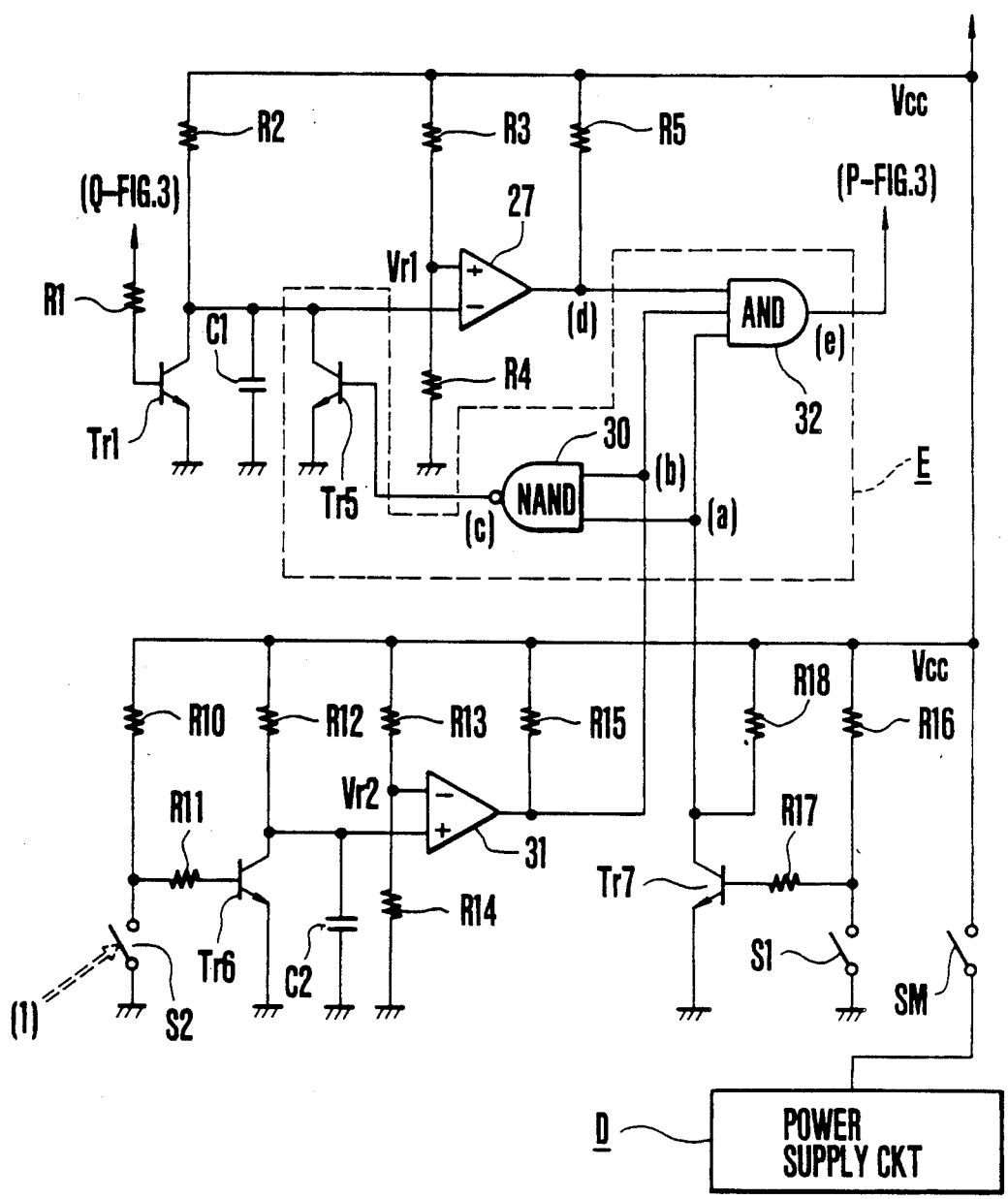
FIG. 6 is a circuit diagram showing the circuit arrangement of a recording and/or reproducing apparatus in a second embodiment of the invention.

The power supply circuit D operates the power supply via a main switch SM to the motor servo system A, the control system B, the warning arrangement C and other necessary circuit elements. In the circuit arrangement of FIG. 3, the main switch SM is interlocked with the operation ordering switch S1. However, the two may operate independent from each other. In that instance, control means such as a switching transistor Tr5 and a NAND circuit 30, which are shown in FIG. 6, are preferably added to the circuit arrangement.

The apparatus which is arranged as shown in FIG. 3 operates as follows: The apparatus cuts off the power supply to the motor 6 when the phase signal PG is not obtained at the terminal Q within a predetermined period of time after power is supplied to the disc rotating motor 6. When the main switch SM and the operation ordering switch S1 which is interlocked with the main switch SM are closed, closure of the switch SM allows power to be supplied to each element of the control system B. With the switch S1 closed, the transistor Tr2 turns off. As a result, the reference potential Vr1 applied to the non-inversion input terminal (+) of the comparison circuit 27 causes the circuit 27 to produce a high level output. Accordingly, the control input level to the terminal P of the motor driving circuit 26 becomes high. Then, power is supplied to the motor 6 to start it. The following description deals with the operation of the apparatus of FIG. 3 under different conditions, one separate from another.

(1) Under a condition where the cassette 1 (FIG. 1) is appositely mounted or loaded on the apparatus and the center core 3 (FIG. 2) is correctly coupled with the hub 8 mounted on the rotation shaft 7 of the motor, the phase signal PG is produced at the PG coil 12 as shown in FIG. 4(a) as the magnetic disc 2 is rotated by rotation of the rotation shaft 7 of the motor 6. The phase signal PG thus produced has its wave-form shaped into pulses which are produced at the terminal Q as shown in FIG. 4(b). This pulse output is periodically supplied to the base of the transistor Tr1. If none of the pulses of FIG. 4(b) is supplied from the terminal Q, the transistor Tr1 turns off allowing the capacitor C1 to be charged via the resistor R2. However, when each of the pulses is supplied from the terminal Q, the transistor Tr1 turns on discharging the electric charge of the capacitor C1 via the transistor Tr1. The capacitor C1 is thus alternately charged and discharged repeatedly depending on the pulses produced from the terminal Q. Then, with the values of the resistor R2 and the capacitor C1 of the time constant circuit and that of the above reference potential Vr1 set at suitable values, the voltage of the capacitor C1 never exceeds the reference potential Vr1, as shown in FIG. 4(c). Accordingly, the output level of the comparison circuit 27 is kept high, as shown in FIG. 4(d), as long as the magnetic disc 2 is normally rotating. The motor 6 then continually receives power. The servo system A then controls the rotating velocity and rotating phase of the rotation shaft 7 of the motor 6 under that condition.

(2) In the event that the cassette 1 is not loaded or mounted or not correctly loaded or mounted and if the magnetic disc 2 does not rotate, the phase signal PG is not obtained as shown in FIG. 5(a), and the terminal Q does not produce any pulses as shown in FIG. 5(b). Accordingly, the transistor Tr1 remains off. The capacitor C1 is then charged on one side. When the charge voltage of the capacitor C1 exceeds the reference potential Vr1 as shown in FIG. 5(c), the output level of the comparison circuit 27 becomes low cutting off power to the motor 6. Furthermore, referring to FIGS. 4 and 5, a reference symbol "ta" denotes a time at which the switches SM and S1 are closed. A reference symbol "tb" of FIG. 5 denotes a time at which the output level of the comparison circuit 27 changes from a high to a low level. The embodiment thus prevents the motor 6, the motor driving circuit 26 and the magnetic disc 2 from being damaged by a continuous large current flow and prevents wasted electric energy by cutting off the power to the motor 6 if no signal is obtained representing the rotation of the magnetic disc 2 when power is supplied to the magnetic disc rotating motor 6.

Furthermore, when the power to the motor 6 is cut off as mentioned above, the low level potential of the terminal P of the motor driving circuit 26 is applied to the base of the transistor Tr4 turning on the transistor Tr4. With the transistor Tr4 thus turned on, the oscillator 29 begins to operate. As a result, a warning is given by the sound emitting element 28 or alternatively by the above visual display element. Note that, in this instance, the switches SM and S1 must be interlocked.

When the block B1 is added, the embodiment operates as follows:

(3) First, in the event that the switches SM and S1 are closed while the switches S2 is open with the cassette 1 not loaded or mounted, the open switch S2 turns on the transistor Tr3. Therefore, the terminal P of the motor driving circuit 26 is kept at a low level to turn off the power supply to the motor 6. In this case, if the warning arrangement C is provided, a warning will be given in the same manner as mentioned in the foregoing.

(4) If, contrary to the above, the switches SM and S1 are closed while the switch S2 is closed with the cassette 1 loaded or mounted, the closed switch S2 turns off the transistor Tr3. The level of the terminal P becomes high supplying power to the motor 6. The motor 6 begins to rotate and the motor servo system A becomes operative. Then, if the PG signal is still not obtainable from the PG coil 12 under this condition, the power supply to the motor 6 is also cut off in the same manner as in the situation of paragraph (2) above.

In the situations of both (3) and (4), if the loading or mounting of the cassette 1 is not detected, no power is supplied to the motor 6 even when the switches SM and S1 are closed. Conversely, if the cassette 1 is loaded or mounted and the switch S2 closes, the terminal P level of the motor driving circuit 26 becomes high supplying power to the motor 6. However, in this instance, whether or not power is actually supplied to the motor 6 also depends on the conditions of other switches and other circuits as mentioned in the foregoing.

Figure 7:
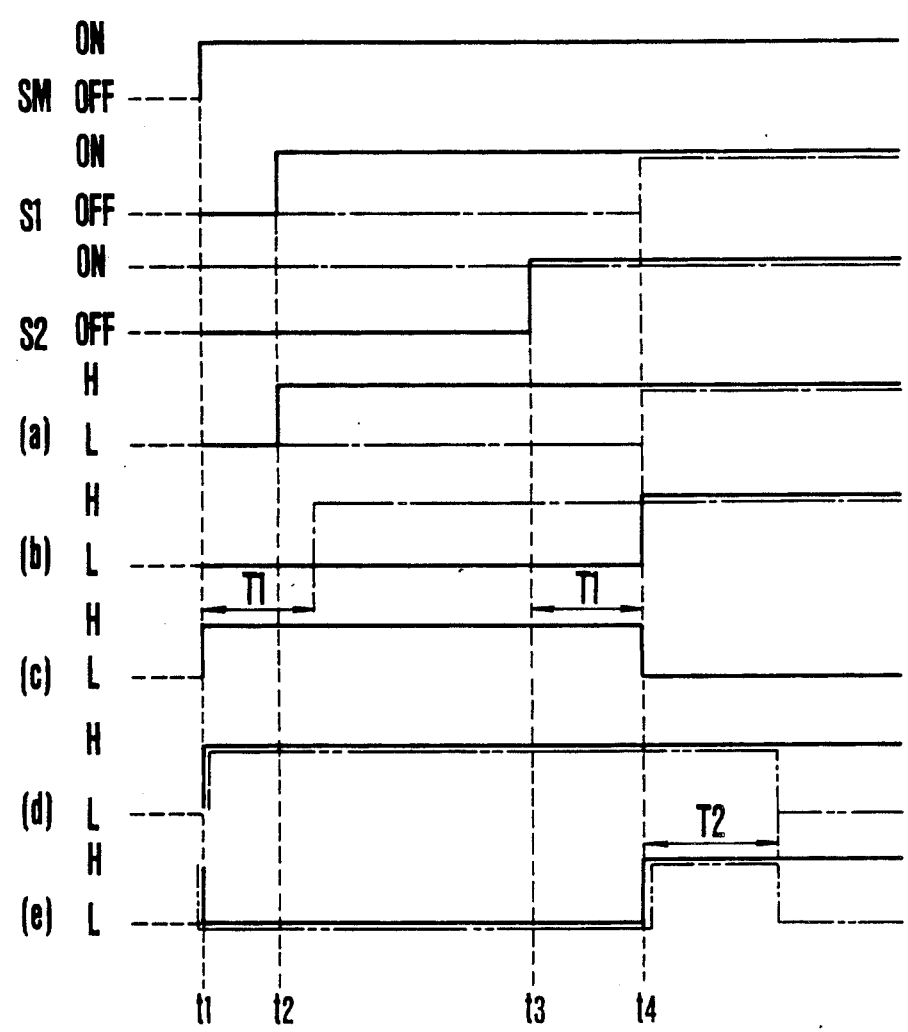
FIG. 7 is a chart showing the operation of the apparatus shown in FIG. 6.

Embodiments II (FIGS. 6 and 7)

The upper half portion of FIG. 6 shows a circuit arrangement which performs basically the same function as the control system B of FIG. 3, and the lower half portion of FIG. 6 is arranged as follows: When means for detecting loading or mounting of the recording medium (such as a recording medium loading detection switch S2) detects loading or mounting of the recording medium under a condition where an operating order is issued by operation ordering or instructing means (such as an operation ordering switch S1) to recording medium driving means (such as a disc rotating motor 6), the recording medium driving means begins to operate after the lapse of a predetermined time period. The purpose of this arrangement is to prevent the recording medium and parts associated therewith from being damaged by something like incorrect loading or mounting of the recording medium either during the loading or mounting of the recording medium or immediately afterwards and also to protect the operator from any danger resulting therefrom.

The arrangement of FIG. 6 is to be coupled with the motor servo system A of FIG. 3 in the same manner as the control system B of FIG. 3. In FIG. 6, the circuits and elements indicated by the same reference numerals and symbols as those used in FIG. 3 are arranged and perform functions basically in the same manner as those shown in FIG. 3. In the upper half of FIG. 6, the base of the npn switching transistor Tr1 is connected to the output terminal Q of the PG signal shaping circuit 23 via the resistor R1 in the same manner as shown in FIG. 3. Between the collector of the transistor Tr1 and the ground is connected the capacitor C1 which together with the resistor R2 forms the time constant circuit. The capacitor C1 is further connected to the inversion input terminal (−) of the comparison circuit 27. The comparison circuit 27 has the reference potential Vr1, which is determined by the voltage dividing resistors R3 and R4, supplied to the non-inversion input terminal (+) thereof. The circuit arrangement differs from that of FIG. 3 in the following way. The collector-emitter circuit of an npn switching transistor Tr5 is connected parallel to the capacitor C1 and the base of the transistor Tr5 is connected to the output terminal of a NAND circuit 30. With the exception of the transistor Tr5, other circuit elements operate in the same manner as the corresponding elements of FIG. 3.

In the lower half portion of FIG. 6, the cassette loading detection switch S2 is connected via a resistor 10 to a power source Vcc and via a resistor R11 to the base of an npn switching transistor Tr6. The collector of the transistor Tr6 is connected via a resistor R1 to the power source while the emitter of the transistor Tr6 is grounded. A capacitor C2, which forms a time constant circuit together with the resistor 12, is connected between the collector of the transistor Tr6 and the ground. Furthermore, one of the terminals of the capacitor C2 is connected to the non-inversion input terminal (+) of a comparison circuit 31. Resistors R13 and R14 are voltage dividing resistors and are connected in series to the power source. A connection point between the resistors R13 and R14 is connected to the inversion input terminal (−) of the comparison circuit 31 supplying a reference potential Vr2 thereto. The output terminal of the comparison circuit 31 is connected via a pull-up resistor R15 to the power source and to a second input terminal of an AND gate 32 which will be described later herein. The operation ordering switch S1 is connected via a resistor R16 to the power source and via a resistor R17 to the base of an npn switching transistor Tr7. The collector of the transistor Tr7 is connected via a pull-up resistor R18 to the power source and is also connected to a third input terminal of the AND gate 32 which will be described later. The output terminal of the comparison circuit 31 and the collector of the transistor Tr7 are connected to the input terminals of a NAND circuit 30. A first input terminal of the AND gate 32 is connected to the output terminal of the comparison circuit 27. The power supply circuit D supplies power to the above circuits and other elements via the main switch SM in the same manner as in FIG. 3. In the following description of the operation of this embodiment, the main switch SM and the operation ordering switch S1 operate independent of each other. However, these switches SM and S1 may operate in association with each other.

Referring now to FIG. 7, the circuit arrangement of FIG. 6 operates as follows. In part 7, parts SM, S1 and S2 show the operations of the switches SM, S1 and S2 of FIG. 6. Parts (a)–(e) show variations of potentials which take place at points (a)–(e) of FIG. 6. In these parts SM, S1, S2, (a) and (b), full lines represent a situation in which the cassette loading detection switch S2 closes after the other switches and after one-dot-chain lines, a situation in which the switch S2 is closed beforehand. In other parts (d) and (e), full lines represent normal operation of the apparatus and two-dot-chain lines represent abnormal operation thereof.

In the following, (1) operation of the circuit arrangement of FIG. 6 when the cassette loading detection switch S2 is closed after the other switches and (2) operation with the switch S2 closed beforehand will be described in a time sequence:

(1) When the main switch SM is closed and turned on, power is supplied to each circuit of FIG. 6. The transistor Tr7 turns on as the base thereof is at a high level with the switch S2 opened. The potential level (a) on the collector side of the transistor Tr7 then becomes low (L). The transistor Tr6 turns on as its base is at a high level with the switch S1 opened. The capacitor C2 is not charged and the output level (b) of the comparison circuit 31 becomes low (L). Accordingly, the output level (c) of the NAND circuit 30 becomes high (H). Since the disc rotating motor 6 has not yet begun to rotate, no pulse output is produced at the terminal Q of FIG. 3. Therefore, the transistor Tr1 of the base thereof is at a low level and is off. However, the transistor Tr5 turns on when the base thereof is at a high level (the potential of (c)). The capacitor C1 is, therefore, not charged. As a result, the output level (d) of the comparison circuit 27 becomes high (H). Since the inputs (a) and (b) of the AND gate 32 are at a low level (L), the output level (e) of the AND gate 32 is also at a low level (L). The motor 6 thus receives no supply.

Next, when the operation ordering switch S1 is closed and turned on, the transistor Tr7 turns off as its base level becomes low (L) and the output (a) becomes high (H), while other conditions remain unchanged.

Then, when the switch S2 is closed and turned on with the cassette 1 loaded, the transistor Tr6 turns off as its base level becomes low (L). Thus, the capacitor C2 is charged. Then, after the lapse of a period of time T1 determined by the time constant of the resistor R12, the capacitor C2 and the reference potential Vr1, the output level (b) of the comparison circuit 31 becomes level (H). As a result, the levels of all inputs of the AND gate 32 become high resulting in a high level (H) of the output (e) of the AND gate 32. The control input level (at the terminal P) of the motor driving circuit 26 then becomes high supplying power to the motor 6. The rotation shaft 7 of the motor 6 begins to rotate. At the same time, the high levels of the outputs (a) and (b) cause the level of the output (c) of the NAND circuit 30 to become low (L). Accordingly, the transistor Tr5 turns off.

With the power supplied to the motor 6, when the magnetic disc 2 within the cassette 1 normally rotates, the phase signal PG is produced at the PG coil 12. Then, the above periodical pulse output is produced at the terminal Q. Accordingly, the transistor TR1 turns on every time the pulse output is produced at the terminal Q. Then, since the transistor Tr5 is off, charging and discharging of the capacitor C1 are repeated in the same manner as in the circuit arrangement of FIG. 3. The charge voltage of the capacitor C1 never exceeds the reference potential Vr1. This keeps the output (d) of the comparison circuit 27 and the output (e) of the AND gate 32 at high levels (H).

However, in the event that the magnetic disc 2 does not rotate after power is supplied to the motor 6, the above pulse output is not obtained at the terminal Q. As a result, the capacitor C1 is charged on one side in the same manner as in the circuit arrangement of FIG. 3. Then, the level of the output (d) of the comparison circuit 27 is changed to a low level (L) after the lapse of a time period T2 (FIG. 7), determined by the time constant of the resistor R2 and the capacitor C1 and the reference potential Vr1. Therefore, the level of the output (e) of the AND gate 32 also becomes low (L) and the power to the motor 6 is cut off.

(2) When the cassette 1 is already loaded or mounted and the switch S2 is already closed, when the main switch SM is closed (a point of time 1 in FIG. 7), the transistor Tr6 is off from the beginning, since the base thereof is at a low level from the beginning. When the capacitor C2 is charged, the level of the output (b) of the comparison circuit 31 becomes high (H) after the lapse of a time period T1 (FIG. 7) from the point of time t1. The rest of the operation is identical with the operation described in (1) above.

Then, when the switch S1 is closed, the transistor Tr7 turns off in the same manner as in (1) above. The output (a) becomes high (H). Therefore, the level of the output (e) of the AND gate 32 immediately becomes high (H) supplying power to the motor 6. Furthermore, the high levels (H) of the outputs (a) and (b) change the level of the output (c) of the NAND circuit 30 to a low level (L). The operation after power is supplied to the motor 6 is the same as in the situation of (1) above. Furthermore, in FIG. 7, the time at which the switch S1 is closed is indicated by a reference symbol t4 for the purpose of concurrently showing the timing of the outputs (c)–(e) compared with the operation described in (1) above. However, the operation is not limited to this timing. The same operation can be performed by closing the switch S1 at any time after the lapse of the time period t1 from the point of time t1.

In situations where the switches SM and S1 are interlocked with each other, the operation timing of the two switches and the timing of changes in potentials at parts, which are directly related to these switches, differ from FIG. 7. With this exception, the operation of that arrangement is similar to the operation described in the foregoing.

The foregoing description has given embodiments wherein the control system B of FIG. 3 and the control system of FIG. 6 are arranged in combination with the motor servo system A of FIG. 3. However, as will be apparent to those skilled in the art, the apparatus according to the invention can be independent from the motor servo system. Furthermore, in accordance with the invention, the recording medium movement detecting means is not limited to the above PG signal detecting means. The PG signal detecting arrangement may be replaced with some other suitable means, such as to detect the above frequency signal FG or to detect the rotation or travel of the recording medium.

Figure 8:
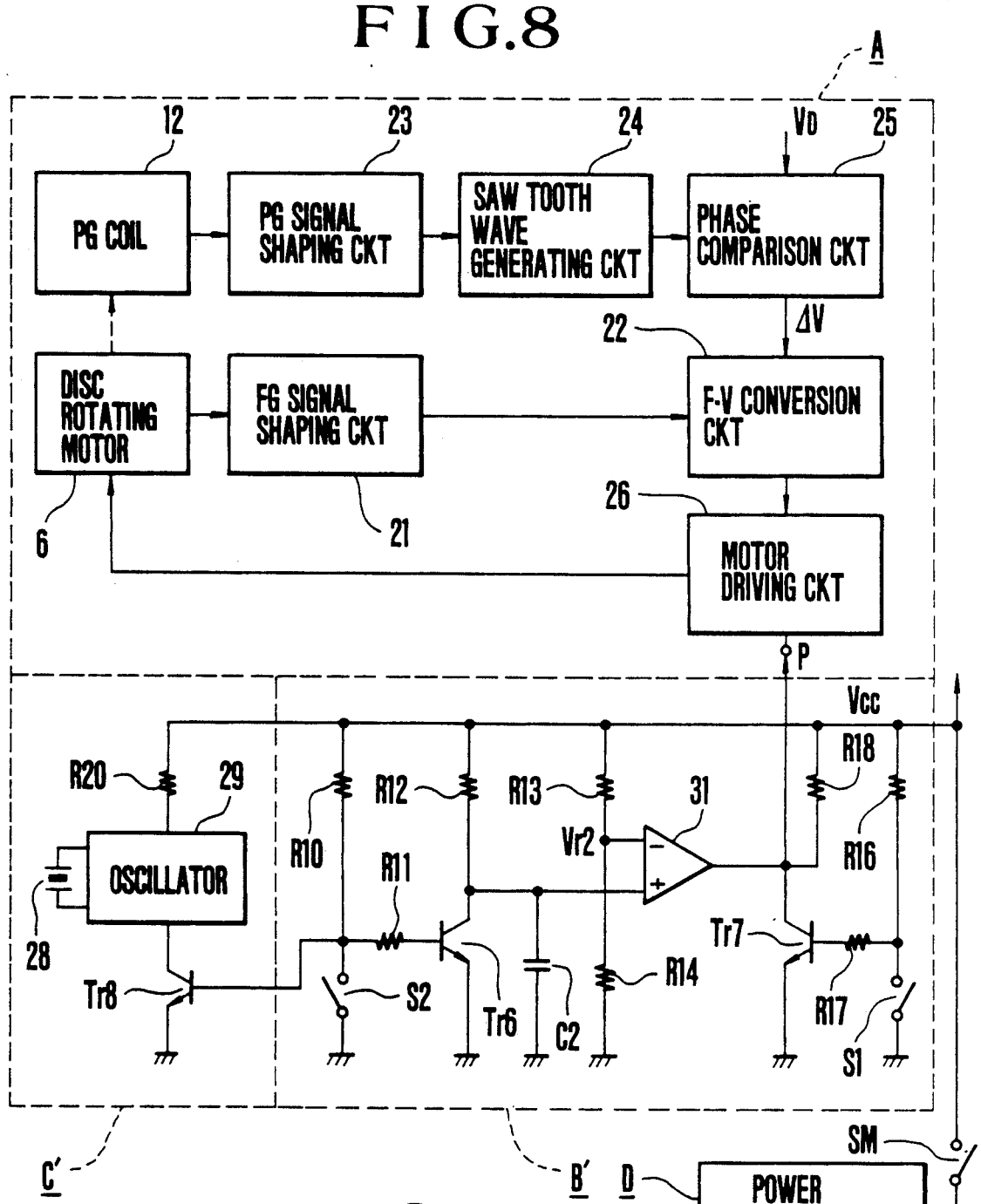
FIG. 8 is a circuit diagram showing the circuit arrangement of a recording and/or reproducing apparatus in a third embodiment of the invention.
Figure 9:
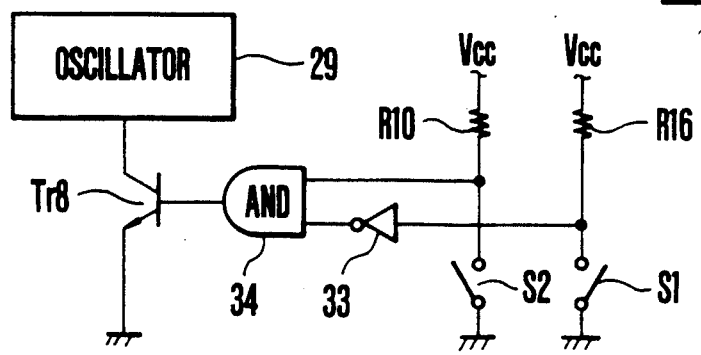
FIG. 9 is a circuit diagram showing, by way of example, a modification of a warning arrangement included in the apparatus shown in FIG. 8.

Embodiment III (FIGS. 8 and 9)

In a third embodiment of the invention, the control input terminal P of the motor driving circuit 26 is connected to a control system B' described below. When the control input level to the terminal P is high, the above motor servo system A operates normally. When the control input is at a low level, power to the motor 6 is cut off. In other words, the control system B' of this embodiment controls the start and stop of the disc rotating motor 6. Referring to FIG. 8, a block A represents a motor servo system which operates in exactly the same manner as the system shown in FIG. 3. Another block B' represents a control system. Unlike the embodiment of FIG. 6 in which the upper half of the circuit arrangement is used for the control system, in the third embodiment the control system B' modifies the lower half portion of FIG. 6 by connecting the output terminal of the comparator 31 to the collector of the transistor Tr7 and also to the control input terminal P of the motor driving circuit 26 disposed within the motor servo system A. A warning arrangement C' differs from that of FIG. 3 in that the oscillator 29 is connected via a resistor R20 to the power source and via an npn switching transistor Tr8 to the ground of the circuit. Another point of difference from the arrangement of FIG. 3 lies in that: This transistor Tr8 has its base connected to a connection point between the resistor R10 and the recording medium loading detection switch S2 disposed within the control system B'. In FIG. 8, the elements that are identical with the corresponding ones shown in FIGS. 3 and 6 in terms of arrangement and function are indicated by the same reference numerals and symbols.

The apparatus which is arranged as shown in FIG. 8 operates as follows: The operation of the apparatus becomes different depending on whether an operation ordering switch S1 for the recording medium driving means is operated first or whether a cassette loading detection switch S2 operates first. However, a feature of the embodiment lies in that the disc rotating motor 6 never operates even when the main switch SM and the operation ordering switch S1 are closed unless the loading detection switch S2 is closed with the cassette 1 loaded in the apparatus.

(1) First, when the main switch SM is closed, power is supplied to the elements disposed within the motor servo system A and the control system B'. Then, if the cassette 1 has already been loaded, the switch S2 has already been closed. Therefore, in that instance, the transistor Tr6 turns off. The capacitor C2 is charged via the resistor R12. The charge voltage of the capacitor C2 exceeds a reference potential Vr2 after the lapse of a time period determined by the time constant of the capacitor C2 and the resistor R12 and the reference potential Vr2. Therefore, the output of the comparison circuit 31, which has been at a low level until that time, changes to a high level. However, if the switch S1 is not closed then, the transistor Tr7 is on. Therefore, power is not supplied to the motor 6 as the terminal P level of the motor driving circuit 26 is at a low level. However, if the switch S1 is closed after the lapse of the above time period t from the closing of the main switch SM, the transistor TR7 turns off. Then, the terminal P level of the motor driving circuit 26 immediately becomes high supplying power to the motor 6 and the magnetic disc 2 begins to rotate. The motor servo system A then controls the motor 6.

If, contrary to the above, the cassette 1 is not loaded, the switch S2 is open. Therefore, in that event, the transistor Tr6 turns on when the main switch SM is closed. The capacitor C2 is not charged. The output of the comparison circuit 31 remains at a low level. The level of the terminal P, therefore, remains low and the motor 6 does not operate even when the transistor Tr7 turns off with the switch S1 closed. In other words, when the recording medium is not loaded, the recording medium driving means remains inoperative even when the main switch SM and the operation ordering switch S1 are closed for the recording medium driving means, so that electric energy can be saved.

(2) When the cassette 1 is loaded with the switches SM and S1 closed beforehand, the switch S2 closes. This turns off the transistor Tr6. The capacitor C2 is charged. After the lapse of the above time period t, the output level of the comparison circuit 31 becomes high and, therefore, that of the terminal P also becomes high. The motor 6 begins to operate driving the magnetic disc 2. In other words, when the recording medium is loaded with the main switch SM and the operation ordering switch S1 for the recording medium driving means has been closed beforehand, the recording medium is driven after the lapse of the above predetermined time period t. Therefore, the recording medium is never driven during a loading process or immediately after the loading process. This arrangement, therefore, effectively prevents the recording medium and parts associated therewith from being damaged by inapposite loading and also protects the operator from any danger. The above predetermined time period t can be set at a value within a wide range according to the values of the resistor R12 and the capacitor C2, which are forming a time constant circuit, and/or those of the voltage dividing resistors R13 and R14. Some arrangement making the values of these circuit elements variable permits adjustment of the above predetermined time period t as desired.

The circuit arrangement shown in FIG. 8 includes a warning arrangement C'. The warning arrangement is arranged as follows. In the event that the main switch SM is closed while the cassette 1 is not loaded, the switching transistor Tr8 which turns on when the cassette loading detection switch S2 is open actuates the oscillator 29 gives a warning with the sound emitting element 28 or the visual display element.

FIG. 9 shows a variation of the above warning arrangement. The warning arrangement in this case includes an inverter 33 which receives the potential of a connection point between the switch S1 and the resistor 16; and an AND gate 34 which receives the potential of a connection point between the switch S2 and the resistor R10 and the output of the inverter 33. The npn switching transistor Tr8 is under the control of the output of this AND gate 34. The transistor Tr8 in turn controls the oscillator 29. In this situation, when the main switch SM is closed without the cassette 1 being loaded, the warning arrangement C' does not immediately operate and operates when the operation ordering switch S1 for the recording medium driving means is closed.

While the embodiments described in the foregoing use a magnetic disc contained in a cassette, the invention is, of course, also applicable to other apparatus using an optical disc as the recording medium. Furthermore, in accordance with the invention, the recording medium, of course, does not have to be contained in a cassette. Furthermore, the invention is also applicable to apparatus of the kind using a strip-shaped recording medium such as a magnetic tape or the like. For example, the invention is also applicable to a video cassette recorder. In that event, tape take-up means may be employed as recording medium driving means; and, as for the recording medium movement detecting means, some means that is capable of detecting the travel of the tape, such as a fixed magnetic head, may be employed.

What I claim:

1. A recording and/or reproducing apparatus using a recording medium having an engaging portion provided with a magnetized indicating member, comprising:
    (a) driving means for driving the recording medium at a predetermined period according to an operation instructing signal, said driving means being arranged to drive said recording medium by engaging with the engaging portion of said recording medium and holding it;
    (b) detection means for detecting the movement of said recording medium, said detecting means generating a periodical signal in response to the movement of said recording medium by detecting said indicating member magnetically;
    (c) stop means for stopping the driving of the recording medium driven by said driving means in the case where said detection means does not output a predetermined amount of said periodical signal within a predetermined period of time after the driving means is caused to operate to drive the recording medium;
    (d) loading detection means for detecting completion of loading of the recording medium into said apparatus; and
    (e) delay means for driving said driving means after a predetermined lapse of time from the detection of loading of said recording medium by said loading detection means in the case where the operation instructing signal is delivered to the driving means prior to the loading of said recording medium.

2. An apparatus according to claim 1, wherein said recording medium includes:
    (a) a core part to be engaged by said drive means, said core part including said magnetized indicating member; and (b) a recording and/or reproducing part supported by said core part.

3. The apparatus according to claim 1, further comprising:
designating signal generating means for generating a designation signal to start operating said drive means.

4. The apparatus according to claim 1, further comprising:
a motor for moving said recording medium by rotation; and
enabling means for enabling said motor to drive only when the apparatus is loaded with the recording medium.

5. The apparatus according to claim 1, further comprising:
warning means for producing a sensible warning when said drive means is caused to stop the driving of the recording medium by said stop means.

6. The apparatus according to claim 5, wherein said warning means is arranged to produce an audible warning.

7. The apparatus according to claim 5, wherein said warning means is arranged to produce a visible warning.

8. A recording and/or reproducing apparatus using a recording medium having an engaging portion provided with a magnetized indicating member, comprising:
(a) driving means for driving the recording medium at a predetermined period according to an operation instructing signal, said driving means being arranged to drive said recording medium by engaging with the engaging portion of said recording medium and holding it;
(b) detection means for detecting the movement of the recording medium, said detection means generating a periodical signal in response to the movement of said recording medium by detecting said indicating member magnetically;
(c) counting means for counting clock signals, said counting means being arranged to be reset in its counting value in accordance with said periodical signal and to count again said clock signals;
(d) stop means for stopping the driving of the recording medium by said driving means responsive to said counting means having a counting value corresponding to a predetermined period;
(e) loading detection means for detecting completion of loading of the recording medium into said apparatus; and
(f) delay means for driving said driving means after a predetermined lapse of time from the detection of loading of said recording medium by said loading detection means in the case where the operation instructing signal is delivered to the driving means prior to the loading of said recording medium.

9. An apparatus according to claim 8, wherein said counting means includes:
(a) a capacitor;
(b) a charging circuit for charging said capacitor at a predetermined time constant; and
(c) means for comparing a charged level of said capacitor with a predetermined level.

10. An apparatus according to claim 9, wherein said counting means further includes:
(d) a discharging circuit for discharging said capacitor in response to said intermittent detection signal.

11. An apparatus according to claim 8, wherein said counting means is so arranged that it is reset by said intermittent signal before the counting of said predetermined period.

12. An apparatus according to claim 8, wherein said stop means stops said drive means by stopping a supply of power to said drive means.

13. The apparatus according to claim 8, further comprising:
designating signal generating means for generating a designation signal to start operating said drive means.

14. The apparatus according to claim 8, wherein said driving means includes a motor for rotating said recording medium, and said apparatus further comprises:
enabling means for enabling said motor to drive only when the apparatus is loaded with the recording medium.

15. The apparatus according to claim 8, further comprising:
warning means for producing a sensible warning when said drive means is caused to stop the driving of the recording medium by said stop means.

16. The apparatus according to claim 8, wherein said warning means is arranged to produce an audible warning.

17. The apparatus according to claim 8, wherein said warning means is arranged to produce a visible warning.

18. A recording and/or reproducing apparatus using a recording medium having a center core provided with a magnetized indication member, comprising:
(a) driving means for driving the recording medium at a predetermined period according to an operation instructing signal;
(b) detection means for detecting the movement of the recording medium, said detection means generating a periodical signal in response to the movement of said recording medium by detecting said indicating member magnetically;
(c) stop means by stopping the driving of the recording medium by said drive means, without expecting said recording medium in the case where said detection means does not output a predetermined amount of said periodical signal within a predetermined period of time after the drive means is caused to operate to drive said recording medium;
(d) loading detection means for detecting completion of loading of the recording medium into said apparatus; and
(e) delay means for driving said driving means after a predetermined lapse of time from the detection of loading of said recording medium by said loading detection means in the case where the operation instructing signal is delivered to the driving means prior to the loading of said recording medium.

19. An apparatus according to claim 18, further comprising:
(a) means for detecting that said recording medium is set in a predetermined position for recording or reproducing.

20. The apparatus according to claim 18, further comprising:
designating signal generating means for generating a designation signal to start operating said drive means.

21. The apparatus according to claim 18, wherein said driving means includes a motor for rotating said recording medium, and said apparatus further comprises:
   enabling means for enabling said motor to drive only when the apparatus is loaded with the recording medium.

22. The apparatus according to claim 18, further comprising:
   warning means for producing a sensible warning when said drive means is caused to stop the driving of the recording medium by said stop means.

23. The apparatus according to claim 18, wherein said warning means is arranged to produce an audible warning.

24. The apparatus according to claim 18, wherein said warning means is arranged to produce a visible warning.

25. A recording and/or reproducing apparatus using a recording medium, comprising:
   (a) detection means for detecting a loading state of said recording medium;
   (b) driving means for driving said recording medium loaded in said apparatus;
   (c) manually operable means for outputting an operation instructing signal for operating said driving means by manual operation; and
   (d) control means for controlling said driving means for varying an operation of said driving means based on an order of such detection of said detection means that said recording medium is loaded, and an operation of said manually operable means, said control means being arranged to drive said driving means after a predetermined lapse of time from completion of loading of said recording medium in the case where the operation of said operable means is effected prior to loading of said recording medium.

26. An apparatus according to claim 25, wherein said control means stops the driving operation by said drive means when it is detected by said detection means that said recording medium is not loaded.

27. An apparatus according to claim 25, wherein said control means immediately drives said drive means according to an operation of said manually operable means when a detection of the loading of said recording medium by said detection means comes before the operation of said manually operable means.

28. An apparatus according to claim 25, wherein when a detection by said detection means of a loading of said recording medium comes after the operation of said manually operable means, said control means drives said drive means a predetermined period of time after said detection by the detection means.

29. An apparatus according to claim 25, wherein said detecting means includes:
   (a) switching means having two states, the states of said switching means changing in accordance with the loading state of said recording medium.

30. An apparatus according to claim 25, wherein said recording medium is of a disk type and said driving means rotates said disk type recording medium.

31. An apparatus according to claim 25, wherein said manually operable means includes:
   (a) switching means having two states, the states of said switching means changing in accordance with manual operation.

32. A recording and/or reproducing apparatus, comprising:
   (a) detection means for detecting completion of loading of a recording medium to output a detection signal;
   (b) driving means for driving the recording medium loaded in the apparatus;
   (c) instructing means for feeding a drive instructing signal to said driving means; and
   (d) control means for controlling said drive means on the basis of said detection signal and said drive instructing signal and for varying control operation of said driving means in accordance with an order of output of said detection signal and said drive instructing signal.

33. An apparatus according to claim 32, wherein said instructing means is manually operable means.

34. An apparatus according to claim 32, wherein said control means includes inhibiting means for inhibiting operation of said driving means for a predetermined period after completion of loading of said recording medium.

35. An apparatus according to claim 32, and further comprising:
   drive detecting means for detecting a state of driving said recording medium by said driving means; and
   said control means being arranged to stop operation of said driving means if said detecting means has not detected a predetermined driving state of said recording medium even after lapse of a predetermined time from starting of operation of the driving means.

36. An apparatus according to claim 35, wherein said driving detecting means is arranged to detect a rotation phase signal generated in accordance with a rotation of said recording medium.

37. An apparatus according to claim 32, wherein said recording medium is a flexible magnetic disc.

38. A recording and/or reproducing apparatus, comprising:
   (a) detecting means for detecting loading of a recording medium to output a detection signal;
   (b) recording or reproducing means for driving the loaded recording medium and for effecting recording or reproducing on or from the recording medium;
   (c) power supply means for supplying power to said apparatus; and
   (d) display means for displaying a warning in the case where said power supply means is operated before said detection signal is outputted from said detecting means.

39. An apparatus according to claim 38, wherein said instructing means is manually operable means.

40. An apparatus according to claim 38, wherein said control means includes inhibiting means for inhibiting the operation of said driving means for a predetermined period after completion of loading of said recording medium.

41. An apparatus according to claim 38, and further comprising:
   drive detecting means for detecting a state of driving said recording medium by said driving means; and
   said recording means being arranged to stop operation of said driving means if said detecting means has not detected a predetermined driving state of said recording medium even after lapse of a predetermined time from starting of operation of the driving means.

42. An apparatus according to claim 38, wherein said display means includes a sonic display and/or a visual display.

43. An apparatus according to claim 38, wherein said recording medium is a flexible magnetic disc.

44. A recording and/or reproducing apparatus, comprising:
(a) detecting means for detecting loading of a recording medium to output a detection signal;
(b) driving means for driving the loaded recording medium;
(c) instructing means for feeding an operation instructing signal for operating recording or reproducing means;
(d) power supply instructing means for instructing power supply to said apparatus; and
(e) display means for displaying a warning when both of said instructing means and said power supply instructing means are operated before said detection signal is outputted from said detecting means.

45. An apparatus according to claim 44, wherein said instructing means is manually operable means.

46. An apparatus according to claim 44, and further comprising delay means for delaying operation of said driving means for a predetermined period after completion of loading of said recording medium.

47. An apparatus according to claim 44, and further comprising:
drive detecting means for detecting a state of driving said recording medium by said driving means; and
control means for stopping operation of said driving means if said detecting means has not detected a predetermined driving state of said recording medium even after lapse of a predetermined time from starting of operation of the driving means.

48. An apparatus according to claim 44, wherein said display means includes a sonic display and/or a visual display.

49. A recording and/or reproducing apparatus, or according to claim 48, and further comprising:
(a) detecting means for detecting loading of a recording medium to output a detection signal;
(b) recording or reproducing means for driving the loaded recording medium and for effecting recording or reproducing on or from the recording medium;
(c) power supply means for supplying power to said apparatus; and
(d) display means for displaying a warning in the case where said power supply means is operated before said detection signal is outputted from said detecting means.

* * * * *